UNITED STATES PATENT OFFICE.

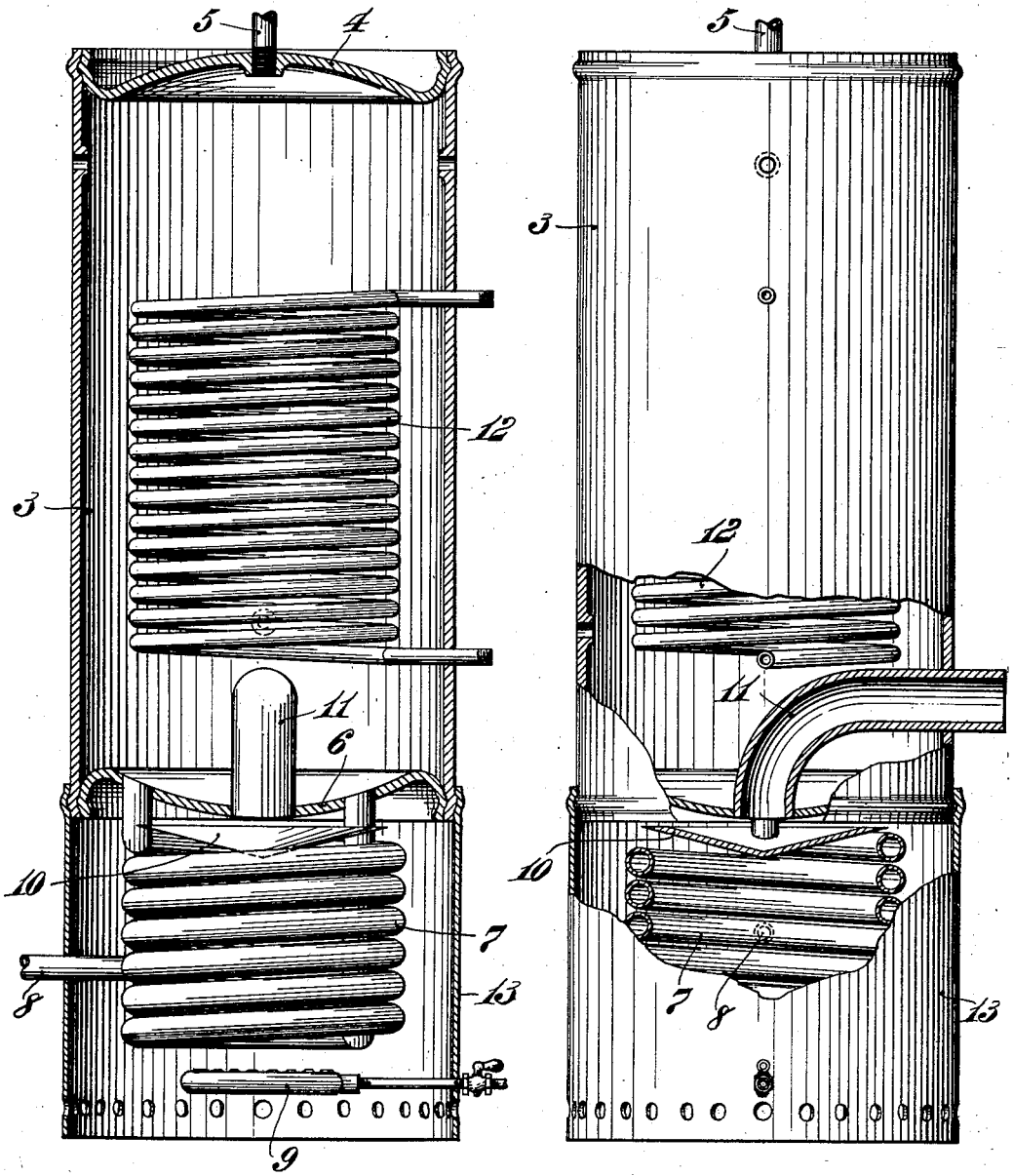

ADOLPHE E. BOSSÉ, OF PITTSBURGH, PENNSYLVANIA, ASSIGNOR TO ACME REFRIGERATING COMPANY, A CORPORATION OF DELAWARE.

AMMONIA-GENERATOR.

1,012,056.  Specification of Letters Patent.  Patented Dec. 19, 1911.

Application filed February 21, 1910. Serial No. 544,971.

*To all whom it may concern:*

Be it known that I, ADOLPHE E. BOSSÉ, a citizen of the United States, residing at Pittsburgh, in the county of Allegheny and State of Pennsylvania, have invented certain new and useful Improvements in Ammonia-Generators, of which the following is a specification.

My invention relates to a generator for use in absorption refrigerating systems, and in such connection it has particular relation to the construction and arrangement of a device for liberating and absorbing the ammonia gas from the aqua ammonia used in such refrigerating systems.

The object of my invention is to provide a simple and efficient device for use as a combined generator and absorber in ammonia absorption refrigerating systems in which the heat applied for driving off the ammonia gas will be utilized to the fullest extent.

My invention also contemplates means for cooling the contained liquor whereby the generator will also act as an absorber, thus obviating the necessity of a separate device for this purpose, to the end that the entire refrigerating system may be simplified.

The nature and characteristic features of my invention will be more readily understood from the following description taken in connection with the accompanying drawings forming part hereof, in which, Figure 1 is a vertical, central section of a generator and absorber embodying the main features of my present invention; and Fig. 2 is a side elevation thereof, partly broken away to expose parts of the interior construction.

Referring to the drawings, 3 is a cylindrical receptacle or tank forming the body of the generator proper. The tank 3 is preferably arranged with its axis vertical and is provided at its upper end with a head 4 into which is tapped a pipe 5 for the passage of the liberated ammonia gas into the refrigeration system. The lower end of the tank 3 is provided with a head 6, preferably dish shaped, from which depends downwardly a coil 7, having its two ends secured to the head 6 at points of different levels whereby the circulation of the liquor through the coil 7 is insured. A pipe 8 for the return of the used ammonia gas to the generator preferably communicates with the coil 7 at some point intermediate the two ends thereof so that the returning gas will pass through the coil 7 and be thoroughly distributed through the liquid contained within the tank 3. Disposed beneath the coil 7 is a burner 9 of any preferred type, so arranged that the products of combustion will pass upwardly through the center of the coil 7, and a baffle plate 10 is arranged at the upper end of the coil 7, being interposed between the interior of said coil and the lower head 6 of the tank 3. The baffle plate 10 serves to deflect the products of combustion so that the heat from the burner 9 will be utilized to the fullest extent. A flue 11 has one end secured in the head 6 over the baffle plate 10, being bent within and passing through the lower part of the tank 3 whereby the heat will be further utilized before the products of combustion are permitted to escape. Arranged within the body of the tank 3 is a cooling coil 12, whereby the liquid contained within the tank 3 may be reduced in temperature at the proper time as hereinafter more fully set forth. The burner 9 and coil 7 are surrounded by a casing 13 which may be perforated near the bottom edge for the ingress of air for the purpose of the combustion. The casing 13 may also serve as a support for the tank 3 as well as a shield to conserve the heat of the products of combustion of the burner 9.

The operation of the device is as follows: The tank 3 initially contains a quantity of aqua ammonia of the desired degree of strength. When the burner 9 is lighted the aqua ammonia will be caused to circulate through the worm 7 becoming heated in its passage therethrough, whereby the ammonia gas will be driven off from the solution and will pass by means of the pipe 5 into the refrigerating system. As is well known in the absorption refrigeration art, the ammonia gas after being driven off by the heat from the generator is then condensed while being maintained at the same high pressure as that of the interior of the generator, whereby the ammonia gas will become liquefied into anhydrous ammonia, after which it may be permitted to expand through the usual expansion valve, losing its pressure at the same time and effecting the refrigeration, after which the gas may be reabsorbed by the then weaker aqua ammonia. In the operation of these systems the action is an intermittent one, the ammonia gas which is driven off being stored after being liquefied, this operation extending over a certain interval of time during which the heat is applied by means of the burner 9. The step of the cycle of operations during which the refrigeration is taking place extends over the greater proportion of the time occupied by the complete cycle.

Heretofore it has been usual to reabsorb the ammonia gas in the weakened ammonia solution in a separate receptacle, but in the device of the present invention the cooling coil 12 is provided, whereby the liquid may be reduced in temperature within the generator proper after the burner 9 is extinguished, and the generator may therefore also be used as an absorber.

By the construction above described there is provided means for obtaining great efficiency in the application of the heat, as well as eliminating complication in the refrigerating system proper on account of the consolidation of the absorber and generator in the one composite structure.

Having thus described the nature and characteristic features of my invention, what I claim as new and desire to secure by Letters Patent is:

1. In a device of the character described, a tank, a heating coil depending from the lower part of said tank, an ammonia return pipe communicating with said heating coil, and a burner located beneath said coil.

2. In a device of the character described, a tank, a heating coil depending from the lower part of said tank, a burner located beneath said coil, a baffle plate interposed between said coil and said tank, a casing surrounding said coil and burner, and a flue passing through said tank for the outlet of the products of combustion.

3. In a device of the character described, a tank, a heating coil communicating with said tank at two points of different levels, an ammonia return pipe communicating with said heating coil, a burner located beneath said coil, a casing surrounding said coil and burner, a baffle plate interposed between said coil and said tank, a flue passing through said tank for the escape of the products of combustion, and a cooling coil located within said tank.

In testimony whereof, I have hereunto signed my name in the presence of two witnesses.

ADOLPHE E. BOSSÉ.

Witnesses:
 MABEL FERRELL,
 SARA EWING.